United States Patent
Sinclair

(10) Patent No.: US 10,437,698 B2
(45) Date of Patent: Oct. 8, 2019

(54) LEADER-FOLLOWER SYSTEM FOR ADDITIVE MANUFACTURING

(71) Applicant: Joseph Matthew Sinclair, Sinking Springs, PA (US)

(72) Inventor: Joseph Matthew Sinclair, Sinking Springs, PA (US)

(*) Notice: Subject to any disclaimer, the term of this patent is extended or adjusted under 35 U.S.C. 154(b) by 0 days.

(21) Appl. No.: 16/255,425

(22) Filed: Jan. 23, 2019

(65) Prior Publication Data

US 2019/0227897 A1 Jul. 25, 2019

Related U.S. Application Data

(63) Continuation-in-part of application No. 62/621,098, filed on Jan. 24, 2018.

(51) Int. Cl.
| | |
|---|---|
| *B33Y 50/02* | (2015.01) |
| *G06F 11/34* | (2006.01) |
| *G06F 11/30* | (2006.01) |
| *H04L 29/08* | (2006.01) |
| *G06F 17/50* | (2006.01) |
| *B29C 64/393* | (2017.01) |

(52) U.S. Cl.
CPC ........ *G06F 11/3447* (2013.01); *B29C 64/393* (2017.08); *G06F 11/3006* (2013.01); *G06F 11/3013* (2013.01); *G06F 17/5009* (2013.01); *H04L 67/125* (2013.01); *B33Y 50/02* (2014.12); *G06F 2217/12* (2013.01)

(58) Field of Classification Search
None
See application file for complete search history.

(56) References Cited

U.S. PATENT DOCUMENTS

| | | | |
|---|---|---|---|
| 9,846,427 B2 | 12/2017 | Straub et al. | |
| 9,912,915 B2 | 3/2018 | Sinclair | |
| 2008/0011728 A1* | 1/2008 | Peters | B23K 9/1068 219/130.5 |
| 2010/0185316 A1* | 7/2010 | Yamada | G05B 19/4142 700/189 |
| 2010/0263543 A1* | 10/2010 | Krauchi | A47J 31/4403 99/280 |

(Continued)

*Primary Examiner* — Bernard G Lindsay
(74) *Attorney, Agent, or Firm* — James R. McDaniel; Lawrence P. Zale

(57) ABSTRACT

Described herein is a Leader-Follower Additive Manufacturing (AM) system which controls multiple AM Devices (3D Printers) simultaneously in order to minimize human monitoring and control during the mass manufacture of AM products. This is accomplished by combining individual AM device closed-loop feedback control with the ability for AM devices to communicate feedback loop data to other AM devices. The communication of feedback loop data between AM devices during the mass fabrication of AM components improves AM process reliability and repeatability. Within the system, AM devices are able to assume the roles of Leaders or Followers; Leader AM devices lead the Follower AM devices during the fabrication of multiple AM products. If errors occur during the fabrication of the AM products, individual AM devices are able to create and implement solutions that solve fabrication errors and communicate that data with the other AM devices for present and future AM fabrication efforts.

13 Claims, 7 Drawing Sheets

(56) References Cited

U.S. PATENT DOCUMENTS

| | | | |
|---|---|---|---|
| 2015/0066177 A1* | 3/2015 | Chien | G05B 19/41865 |
| | | | 700/97 |
| 2016/0339519 A1* | 11/2016 | Sargent | B22F 3/1055 |
| 2017/0031328 A1* | 2/2017 | Sawada | G05B 13/028 |
| 2017/0038757 A1* | 2/2017 | Novakovic | B25J 9/1697 |
| 2018/0253078 A1* | 9/2018 | Sennoun | G05B 19/4099 |
| 2019/0049929 A1* | 2/2019 | Good | G05B 19/4185 |

* cited by examiner

LEADER-FOLLOWER SYSTEM FOR ADDITIVE MANUFACTURING

CROSS-REFERENCE TO RELATED APPLICATIONS

This application is a Continuation-in-part of U.S. Provisional Patent Application 62/621,098, filed Jan. 24, 2018 by the same Inventor, Joseph M. Sinclair, entitled In-Situ Monitoring and Correction Master/Slave Additive Manufacturing (AM) System and Methods of Using the Same and is hereby incorporated by reference to the extent that it does not conflict with the current disclosure.

STATEMENT REGARDING FEDERALLY SPONSORED RESEARCH

Not Applicable.

BACKGROUND

1. Field of Invention

The present invention relates to additive manufacturing (AM) devices which manufacture multiple products, and more specifically is directed toward communications and control systems which correct errors in a network of AM devices.

2. Description of Related Art

Additive manufacturing, ("AM") also called "3D Printing" builds products layer by layer.

AM Fabrication of Products

AM usually takes a longer time to manufacture a product as compared with conventional manufacturing which may use, for example, milling and drilling.

The AM technology was effective for AM fabrication of low-volume production, such as in the case of prototyping. However, for commercial purposes, systems are required which can mass produce AM products. At the time of the writing of this application, there are few systems capable of mass AM manufacturing.

Focused on Prototypes

Since AM's invention in the 1980's, 3D printing technology has been focused primarily on non-end use applications such as prototypes and visual aids. However, AM technology has seen significant improvement over the last decade, many of those improvements focusing on the creation of AM devices capable of producing end-use parts out of material such as metals. As the AM market continues to grow, industry demand for the production of end-use AM components in mass has become a primary focus.

AM is often viewed as having ground breaking potential relative to the fabrication of customizable consumer products, industrial components, etc. As AM, aka 3D printing, adoption has increased, AM's undesirable issues relative to traditional manufacturing techniques have begun surfacing.

Presently, AM adoptability is suffering from an inability to scale AM production to mass manufacturing levels, relative to traditional mass manufacturing techniques.

Traditional mass manufacturing methodologies and techniques, such as injection molding, that are capable of scaling to meet mass manufacturing demands, are reliable, economical, and fast. These three principles enable traditional manufacturing methodologies to support the reliable production of billions of products around the globe every year. In contrast, AM methodologies are currently unreliable, expensive, and slow relative to traditional manufacturing methods.

Failure to Utilize Monitoring Data

AM processes and systems fail to collect and utilize in-situ process monitoring data to correct geometric and mechanical property discrepancies, relative to the intended output, during the fabrication process.

Typically, a 3D model is loaded into an AM device and the entire model is printed. It is later examined for errors and if out of tolerance, it is rejected and discarded as scrap. Since it takes a substantial amount of time to create this product using AM, each rejected product is a loss of efficiency. Also, each rejected product is a loss of raw materials used to manufacture it.

There have been advances, such as U.S. Pat. No. 9,912,915 by the current Inventor, Joseph M. Sinclair, which monitors the product being manufactured, detects errors, and makes corrections as the product is being manufactured.

Therefore, many products may be salvaged if small errors are detected. Also, those with larger errors which may not be corrected are rejected when the errors are detected, saving manufacturing time and raw materials. This is clearly an advancement over the prior art AM devices.

Failure to Produce Traceability & Quality Reports

Additionally, AM processes and systems fail to provide sufficient in-situ process monitoring data from the fabrication process(es) to produce traceability & quality reports for AM components and processes.

Thus far, these trade-offs have been accepted by industry in the hope that AM will one day be able to compete head-to-head with traditional manufacturing process.

This inability for existing AM technologies and systems to produce end-use components at a rate that can match traditional manufacturing methods greatly hinders 3D printing technologies' ability to compete for the manufacture of consumer products.

To address the scalability bottle neck AM is facing, new innovations within the 3D printing arena have primarily focused on speeding up the AM fabrication process. However, these innovations often are able to reduce print speeds by adding additional post process sintering and/or curing steps. This method simply pushes the problem further down the fabrication process and does not fully address the inability for AM to function in a factory environment as do traditional manufacturing technologies.

Repeatability & Reliability

AM processes and systems suffer from repeatability & reliability issues and fail to produce components of near-identical geometric and mechanical properties as is standard with traditional manufacturing processes. AM processes and systems fail to collect and utilize in-situ process monitoring data to correct geometric and mechanical property discrepancies, relative to the intended output, during the fabrication process. Additionally, AM processes and systems fail to provide sufficient in-situ process monitoring data from the fabrication process(es) to produce traceability & quality reports for AM components and processes.

AM processes and systems struggle to produce end-use components in mass.

Currently, there is a need to efficiently mass produce high-quality products using AM.

BRIEF DESCRIPTION OF THE DRAWINGS

The advantages of the system described in this application will become more apparent when read with the exemplary embodiment described in the specification and shown in the drawings. Further, in the accompanying drawings and description that follow, like parts are indicated throughout the drawings and description with the same reference numerals, respectively. The figures may not be drawn to scale and the proportions of certain parts have been exaggerated for convenience of illustration.

SUMMARY

Figure 1:
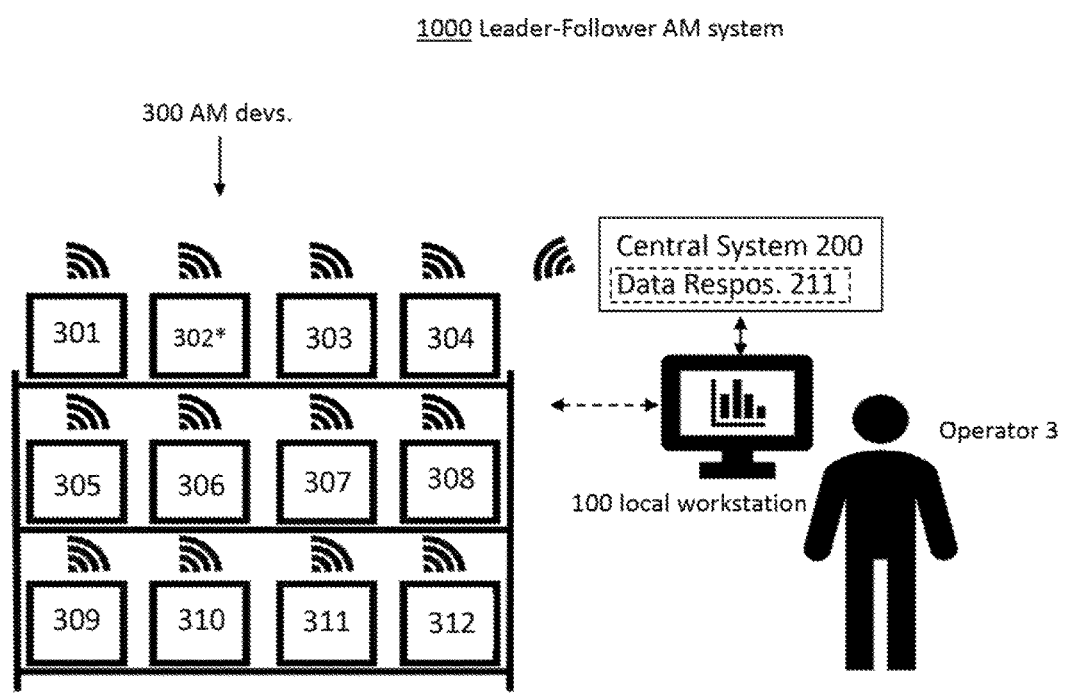
FIG. 1 is a block diagram of a Leader-Follower Mass Additive Manufacturing System according to one embodiment of the current invention.

The current invention may be embodied as a system for manufacturing multiple Additive Manufactured (AM) products having a number of AM devices each adapted to produce a product of a 3D computer model using additive manufacturing (AM), each having sensors to sense physical attributes of the AM devices and the product being manufactured; monitoring equipment coupled to the sensors to monitor physical attributes of the product and AM device; comparison equipment coupled to the monitoring equipment to measure deviations between the product being manufactured and the 3D model, and determine which are outside of predetermined specifications, which are identified as 'errors'; a communication device adapted to communicate with other AM devices as well as a central system. The system also includes a solution generation device adapted to analyze errors and generate machine code intended to correct the errors, and a PLC attached to and at least partially controlling the elements above, adapted to communicate a request from one of the number of AM devices identified as a 'Leader' AM device to the other AM devices to implement actions and the solutions.

The current invention may be embodied as a method of mass producing a product from a 3D model using additive manufacturing (AM) having the steps of providing a plurality of networked AM devices each capable of building and interactively monitoring deviations from the 3D model, building a portion of the product on at least one AM device, monitoring the product to identify deviations from the 3D model, notifying a PLC of the AM device deviations and determining if the deviations are outside of a predetermined specification. If a deviation is outside the predetermined specification, then identifying the deviation as an 'error', and the current AM device as a Leader AM device, collecting and storing the state of the current AM device, collecting and storing the error information of the current AM device, employing a solution generator which creates a machine code solution, creating an error data set with error info, state info and machine code solution. Then communicating the error data set to other AM devices from the Leader AM device with a request to implement the solution. Finally, implementing at least a portion of the machine code solution on at least one AM device other than the Leader AM device.

The current invention may also be embodied as a system for mass producing a product from a 3D model using additive manufacturing (AM) having a Leader AM device which is adapted to manufacture the product, monitor deviations of the product as it is being manufactured, identify errors, create solutions to the errors and send requests to networked AM devices to implement the solution, a plurality of Follower devices networked to the Leader AM device, and able to communicate with the Leader AM device, wherein at least a current Follower AM device is adapted to receive the errors found by the Leader AM device, solutions created by the Leader AM device, state information of the Leader device and the request to implement the solutions. Wherein the current Follower AM device is adapted to make decisions to implement at least a portion of the solution based upon a comparison of the states of the Leader AM device and the current Follower AM device.

DETAILED DESCRIPTION

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

1. Theory

Additive Manufacturing includes any machine, system or process which 'builds' a product by applying successive layers of material on previous layers of the product's surface to result in a final product. These may be AM systems that utilize processes such as sheet lamination, material extrusion, directed energy deposition, vat polymerization, powder bed fusion, binder jetting, material jetting, hybrid processes that combine additive and subtractive processes or combinations of additive processes, as well as other known systems for Additive Manufacturing.

AM devices having similar configurations or device states, may have similar problems or errors.

A system which employs multiple AM devices can be more efficient and accurate if the AM devices share detected errors and the states of the AM devices.

Certain AM errors may be common to more than one AM device.

It is more efficient for AM machines to know of problems before they encounter the problems.

Each AM device has its own local logic.

The AM devices are networked to share information and solutions to encountered errors or problems.

2. Implementation

To enable widespread adoption of AM and improve AM scalability in mass manufacturing environments, a system capable of controlling multiple AM devices simultaneously is disclosed. Each individual AM device automatically collects and utilizes data collected while a product is being manufactured (in-situ process monitoring). This in-situ data is used to determine when an error occurs, create a solution and implement the solution in a closed-feedback loop. Upon completion of the product fabrication process, the automatically collected data is compiled into a quality report for each fabricated component. This will include traceability and process monitoring data. The system(s) and method(s) described herein will allow more accurate and faster mass manufacturing using AM.

The current invention will reduce the requirement for human assistance and/or input during the fabrication of 3D printed parts across multiple AM devices simultaneously. This solution and methodology enable the creation of an automated 3D printing factory where AM device operation and output quality are verified automatically such that quality deviations are addressed without human input.

FIG. 1

FIG. 1 is a block diagram of a Leader-Follower Mass Additive Manufacturing System according to one embodiment of the current invention.

In FIG. 1, twelve individual AM devices 301-312, are networked together. The system described herein is designed to enable a single technician or operator 3 to operate multiple AM devices 301-312 simultaneously.

The system may communicate in two modes. In a first mode, the Operator 3 interacts through a local workstation 100 and communicates directly with the AM Devices 301-312.

In a second mode, Operator 3 communicates through a Central System 200 which communicates with AM devices 301-312.

The Operator 3 working through local workstation 100 has the ability to directly modify or update the 3D model. Operator 3 has the ability to control multiple AM devices simultaneously through local workstation 100. Operator 3, through workstation 100 can also define groups to operate alone, under the control of Operator 3 and workstation 100 or under their own control or under the control of central system 200, or any combination of the above.

Operators are able to directly control AM systems as individuals or groups prior to, during, and after the AM fabrication process within the Leader-Follower AM system. This includes operator ability to manually control or intervene with the detection of errors during the fabrication process and subsequent generation and implementation of error solutions.

Operators are able to specifically set modes of specific printers to act as Leaders, Slaves, or Followers prior to, during, and after the AM fabrication process and production of AM products.

Operators are able to manually delineate fabrication efforts for AM products to individual AM systems, independent of status as Leader, Follower, or Slave.

Leader-Follower

Identifying "AM Device 302" as the 'Leader' for an initial example. Identifying AM Devices "301" and "305-312" as 'Followers' for the initial example.]

By utilizing sensors and sensor data in such a way that enables for all AM devices and operator(s) to be in constant communication throughout the individual AM fabrication processes, vastly improved decision-making processes and speeds, currently unattainable by existing AM methodologies and systems, are possible.

Each AM device 301-312 is similar to that described in U.S. Pat. No. 9,912,915 B2, which is hereby incorporated by its entirety to the extent that it does not contradict the current application.

Within the Leader-Follower methodology, there are three primary systems: the Leader AM device 302, surrounding AM devices (Followers or Slaves) 301, 303-312, and a central system 200. In a Master-Slave relationship, the Master provides commands to the Slave which the Slave executes exactly as commanded. (In this example, AM devices 303 and 304 are Slave AM devices.) However, in a Leader-Follower relationship, the Leader requests that the Followers consider executing a command provided by the Leader. The Followers may then decide to either execute the command as it was provided, modify and execute the command, or not to execute the command. They have internal 'smarts' to decide how they will act.

'Surrounding AM devices' are the AM devices other than the Leader, which may be Followers or Slaves.

The individual AM Devices each have embedded sensors 418 that collect data during printing of a part in order to detect and determine the source of errors that impact the printed part quality. The surrounding 3D printers, each with their own embedded sensors, utilize communications devices 430 to communicate with each other to share and discuss information that improves the fabrication output from the 3D printing process.

Leader AM device 302 exert control over Follower AM devices 301, 305-312 set by Operator 3 to be Followers. The AM Devices 301-312 are provided a 3D Model, that is stored in a Data Repository & Long-Term Storage 411 in each AM device 301-312, of a product which is desired to be produced in mass, layer by layer, by each of the AM devices 301-312.

In an alternative embodiment, a Data Repository & Long-Term Storage 211 resides in the central System 200 and allows all AM devices to access the 3D model.

The 3D model, within the system 1000, may include all information required to manufacture the product. The information includes tolerances and specifications along with equipment settings, such as the proper temperature for a plastic extruder.

The Leader AM Device 302 begins to manufacture the product of the 3D model. When it encounters an error, which may be an out of tolerances geometric measurement, microstructures, chemical compositions, etc. which are out of specification in the product being manufactured, it makes note of all its settings, measurements, configurations at the time of the error (the "state of the AM device"), as well as the error. This error, and AM Leader device 302 state information are stored and provided to the other 'Follower' AM devices 301, 305-312. The 'Follower' AM devices, 301, 305-312, also are able to communicate issues they individually encounter to all other AM devices as well in the same manner.

The AM device 302 may then determine corrective action (a "Solution") to be done while this product is being manufactured. This corrective action may be executable code adjusting the location where the next portion of the layer will be built, adjusting the state of the AM Follower Devices 301, 305-312. This will be referred to as 'autocorrection'.

The Leader 302 then sends a message requesting that the Followers 301, 305-312 follow Leader 302 by implementing the Solution provided by Leader 302.

The AM Follower devices 301, 305-312 then determine if they would like to implement autocorrections, take further corrective action, or take no corrective action based on their individual assessment of how well they are building AM components. If the Leader AM Device 302 is having issues but the AM Follower devices 301, 305-312, are not having quality issues fabricating AM components, then the Leader AM Device 302 will most likely be the only AM device to implement autocorrections in order to ensure the component quality from that individual AM device.

The error may be a geometric deviation, microstructural deviation, or a chemical composition deviation such that, under a Master/Slave relationship, the actions of a Master printer are duplicated on a Slave printer. Each printer, Master or Slave, contains embedded sensors capable of detecting and discerning fabrication issues during the 3D printing process. The collected and generated data also is transmitted to the Central System 200 for storage, additional data analysis, solution generation, and solution implementation. The central system 200 reports this information back to the AM devices directly, Master or Slave, in order to optimize AM device performance throughout the fabrication process through the communication of fabrication issues and solutions (also referred to as "autocorrections") to those fabrication issues. This basic Leader-Follower overview showcases the novel methodology that allows for the mass production of 3D printed components and consumer goods.

Each AM device is equipped with a PLC for machine code execution, data collection and communication.

FIG. 2A

Figure 2A:
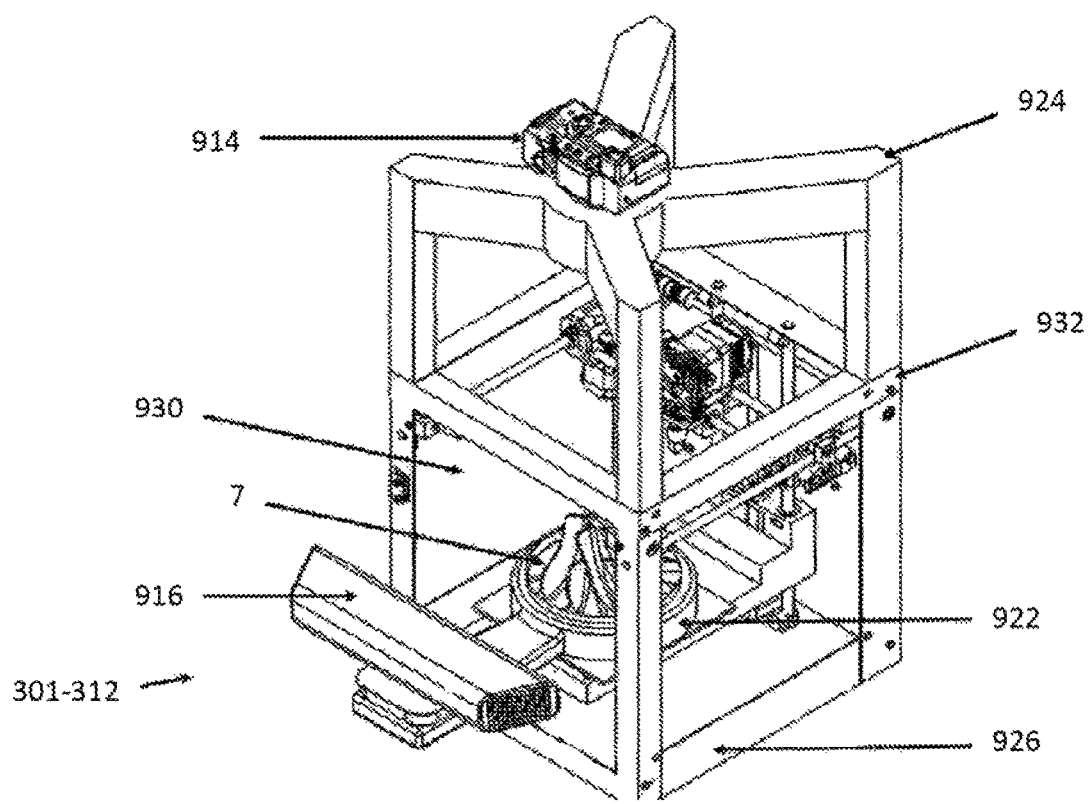
FIG. 2A is perspective view of an AM device 301-312 of FIG. 1.

FIG. 2A is perspective view of an AM device 301-312 of FIG. 1. Here a product 7 is being manufactured layer by layer on a platform 922 inside interior 930 of AM device using additive manufacturing. Imaging devices 914 and 916 act as visual sensors (418 of FIG. 2B) and interact with monitoring equipment (421 of FIG. 2) to identify geometric deviations of the product 7 being manufactured.

The Imaging Device holder 932 has a top end 924 which holds imaging device 914 and a bottom end 926 which supports imaging device 916.

Figure 2B:
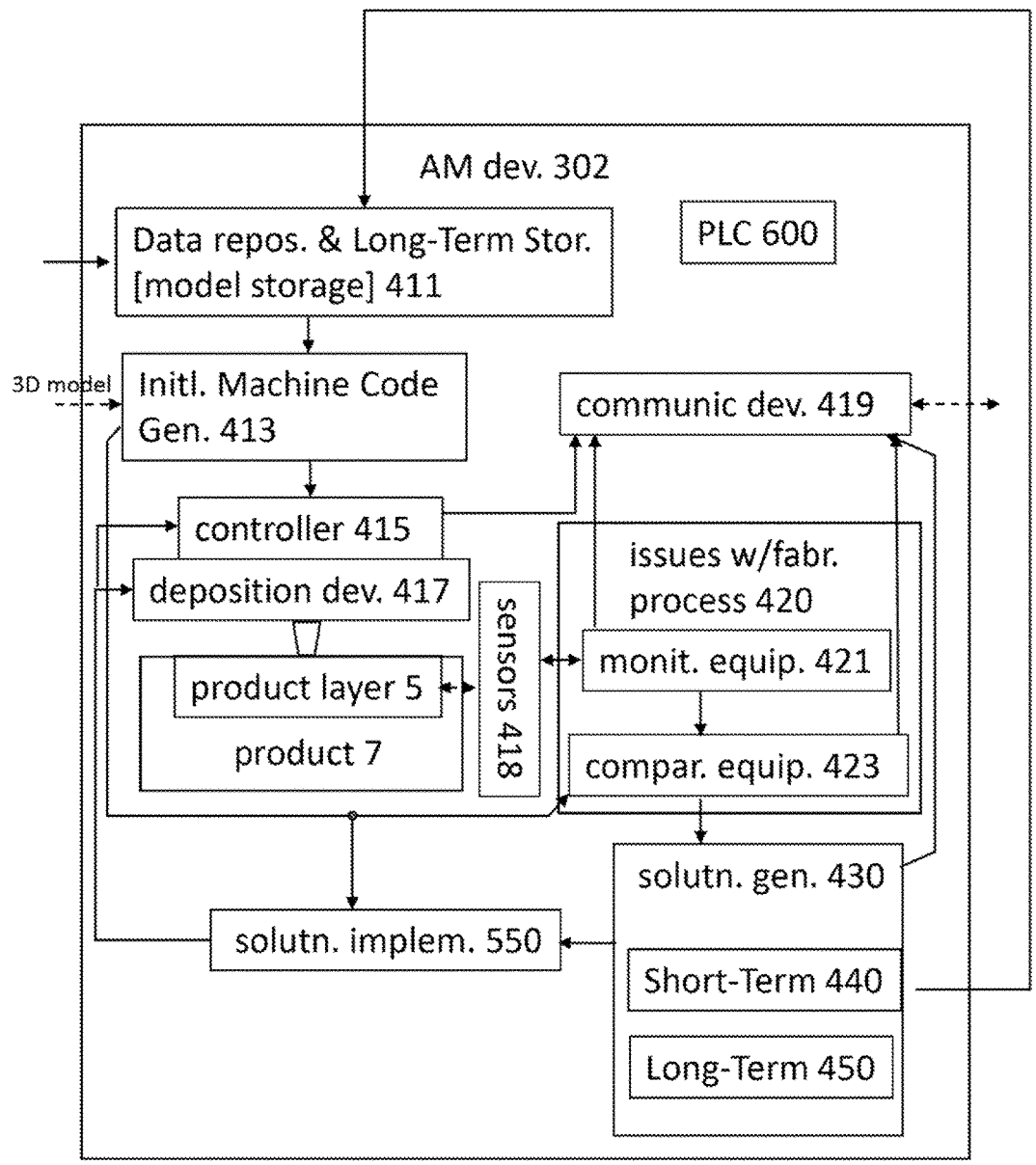
FIG. 2B is a more detailed block diagram of Leader AM device 302 of FIG. 1.

Other elements of the AM devices are described in more detail in FIG. 2B

FIG. 2B

FIG. 2B is a more detailed block diagram of Leader AM device 302 of FIG. 1.

In a first embodiment, a 3-D model of the product desired to be manufactured is stored in Data Repository and Long-term Storage 411.

The 3-D model includes all geometric information to manufacture the product using additive manufacturing. It also includes settings, machine, computer configurations and other information required to manufacture a product closely resembling the model.

This information is provided to the initial machine code generator 413, which positions the model in the proper orientation, and then creates parallel slices from the model which will represent the layers in the additive Manufacturing process.

The Initial Machine Code Generator 413 then passes the slices to a controller 415.

Controller 415 is capable of moving and positioning a deposition device 417.

Deposition device 417 has the ability to build a product layer by layer. A product layer 5 is shown being laid down by deposition device 417. Deposition device 417 may be an extruder which positions and extrudes a liquid material which hardens into a layer.

Alternatively, it may be a laser which hardens powders such as metal powder into a layer 5. It can be an arc welder or soldering device which also creates a layer 5. It may also be any other additive Manufacturing device whose operation falls into the sheet lamination, material extrusion, direct energy deposition, hybrid, vat polymerization, powder bed fusion, binder jetting, and/or material jetting families of AM, and others currently known.

As this product layer 5 is being generated, there are sensors 418 which sense the geometric, chemical composition, micro structure formation of layer 5.

This information is provided to an 'Issues with Fabrication Process Device 420'. 'Issues with Fabrication Process Device 420' includes 'monitoring equipment 421' and 'comparison equipment 423'. Monitoring equipment 421 monitors at least one physical parameter sensed by sensors 418. For example, it may monitor the geometric shape of the layer 5 being created.

Comparison equipment 423 compares the output of 'monitoring equipment 421' to the geometry, microstructure, and chemical composition of the 3D model stored in Data Repository and Long-Term Storage 411 and determines if product layer 5 is outside of specs for its geometry, chemical composition and/or micro structures.

If the differences are outside the specs, it is determined to be an error.

Errors are provided to solution generator 430. Solution generator 430 has a short-term solution device 440 and a long-term solution device 450.

Solution generator 430 determines a solution to the error which may be implemented as machine code. In some cases, it is possible to determine a solution directly, such as a geometric deviation. This can be corrected by adding an offset to the geometric print locations. This may be a geometric change which then causes the next layers to be on track with only a single layer being incorrect.

However, some errors may be multi-causal. For example, a deviation may be a dropping out of spec for a (unsupported) layer passing over a void. This can be a function of the extrusion material viscosity and/or the speed in which the extruder spans the void. The viscosity is typically a function of temperature. Therefore, two independent variables, 1) speed and 2) temperature of the extruder may be adjusted to determine a solution. Typically, these two independent variables are adjusted to minimize the droop.

A 2-dimensional search routine looking for a local minimum would be effective here. In this case the temperature and speed of the deposition device 417 are adjusted for different layers and the deviations are measured to find a minimum droop.

One way to solve this is to use a different speed and temperature every time the same situation occurs. This may require many products to be manufactured before the optimum speed and temperature are determined, if only a single AM device is being used.

If the AM device has a stored past history of similar situations with the speeds and temperatures and a measure of the errors, these can be used and need not be repeated, but can be used if the AM device 'states' are similar.

This would then be a machine which learns from its past (stored) errors, one definition of 'Artificial Intelligence'. What is even more intelligent than a machine which learns from its mistakes, is one which also learns from the errors of other AM devices.

Therefore, not only can the PLC 600 of each AM device look up its past errors, compare the device 'states' and consider the solutions of its own history, but since it can connect to other AM devices through their communications devices 419, which each know of their own history, it is possible for the AM device to utilize information relating to other AM devices. This may be stored for similar errors having similar 'state' information. This may be information currently being acquired, or stored history information. This may be used to generate solutions while multiple AM devices fabricate components simultaneously since they can constantly communicate, diagnose, and solve errors that are occurring in real-time.

If the PLC 600 actively compares various settings for the extruder temperature, and various speeds for the extruder movement, along with the measures error, it is possible to estimate the best settings for these parameters. When a set of data is found of an AM device with a similar state as that of the AM device looking for solutions, the solution associated with the found set of data may be used on the searching AM device.

Similarly, Central system 200 may go through data sets and find two or more AM devices which tend to have the same states across the manufacture of many products. It is most logical to check the past history of these for similar errors and their solutions.

There are also statistical methods of combining error data sets for each AM device across multiple layers of multiple products manufactured. A statistical analysis could find an average extruder temperature and average extruder speed for the 10 data sets with the lowest error.

Any number of other statistical methods may then be applied to result in values for the independent and dependent variables.

Slave or Follower

As indicated above, if Leader 302 identifies an error and sends the error, its solution and the machine 'state' to another AM device, such as AM device 303, requesting that AM device 303 executes the solution and the AM device 303 is designated as a Slave, then it executes the solution exactly as it receives it.

If AM device 303 is designated as a Follower, then it can determine a) if it will execute the solution in the same manner as the Slave, b) not execute the solution, or c) execute a modified version of the solution.

The Follower AM device 301 may use many different types of algorithms to determine which of these three options it will choose.

One is the degree of similarity between the 'state' of the Leader AM device 302 and the 'state' of the Follower. If the states are almost identical, the Follower AM device 301 will implement the solution as it was received. If the states have less than a predetermined minimum threshold of similarity, the solution will not be implemented.

Then there is the choice "c" in which a modified version of the solution is implemented.

For example, if the error of the Leader is twice what the past errors were for the Follower, then the solution may be adjusted by 50%. For example, if the solution of the Leader indicates that the extruder add an offset of 0.02 mm in the "x" direction and 0.04 mm in the "y" to correct an error of 0.03 mm from the model surface, and the Follower in the same part of the model had an average error of 0.015 mm for the last several products, it is reasonable to use an offset of 0.01 mm in the "x" direction and an offset of 0.02 mm in the "y" direction. This is a proportional solution.

This may be done by each individual AM device 301-312, however, it appears to be more efficient to perform this function in the central system 200.

Causes of Deviations

If all AM devices 301-312 are set to the same initial settings and are printing the same 3D model, it is difficult to see why there are variations in the printed products. Each may be exposed to varying amounts of humidity, in the air, in the deposition materials which causes differing temperatures in the deposition device 417, and/or created layer 5.

Heaters may not heat as evenly over time, causing variances in temperature as the deposition device 417 moves, creating portions of the layer 5 which were created using a different temperature. Maintenance routines may not be performed identically between machines causing additional hardware variation.

Static electricity varies spatially over the surface of the PLCs 4xx and Data Repository & Long-Term Storage 411 of each of the AM devices 301-312. Even though modern digital circuits are very resistant to static electricity, even military grade electronics are rated to have up to several errors per million permutations. This means that at the running speeds of 2 Ghz, there are hundreds of miscalculations that must be corrected per second. Large amounts of static electricity increase the number of errors encountered.

Therefore, there will be significant amount of differentiation among the states of the AM devices 301-312.

Procedure Summary

As described above, the sequence is that:

1) an AM device runs into a problem when building a product,
2) it determines that this problem is outside of specs and is an 'error',
3) the AM device determines a solution, and creates a machine code 'patch' (which is one type of autocorrection) to correct it for the short-term completion of the product; the central system uses short-term solutions to determine long-term solutions that will optimize the mass manufacture for the product via AM.
4) the AM device is dubbed a 'Leader',
5) the Leader then collects all its state information, the error, the solutions with 'patch code' as an error data set,
6) the Leader then sends a notice and request to other connected AM devices to follow the Leader,
7a) the connected AM devices, if dubbed Slaves, blindly accept the error data set having the error, solution with patch code, and state information and execute the patch code at the same place in the model in which the Leader hit the error,
7b) the connected AM devices, if dubbed Followers, receive the error data set having the error, solution with patch code, and state information, and determine how close their state information is to the state information of the Leader. If the state information matches that of the Leader closely, the solution is implemented without modification. If the state information of the Leader and Follower differ by more than a predetermined threshold, then the solution is not implemented. If the state information of the Leader and Follower differ by less than a predetermined threshold, then the solution is modified and implemented.

Feeding Executable Code

Since the controller 415 and deposition device 417 are currently running a stream of machine code, a solution implementation device 550 must be employed to feed only a portion of the machine code to the controller 415 and deposition device 417. After each small portion of code is executed, the product layer, or portion of the product layer is monitored by monitoring equipment 421, checked to be within specs by comparison equipment 423 and adjusted by solution generator 430 iteratively, producing a closed loop, monitoring, adjusting and printing loop which is repeated many times throughout the manufacturing process. This insures that an error will not proliferate and create a product which is unusable.

Followers 301, 305-312 of FIG. 1 have the same structures as Leader AM device 302, shown in FIG. 2B but have different logic running in their programmable logic circuits (PLCs) 600.

The PLC 600 of the Leader AM device 302 includes logic which accumulates the settings, sensor readings and other data indicating the 'state' of Leader AM device 302 at least at the time of an error. PLC 600 then stores this information.

The PLCs 600 of each of the AM devices include at least a microprocessor and memory holding executable code, having a data area and scratch area. It is an active element and can read input, perform calculations, make decisions and provide output. Since each PLC 600 is attached to the other devices within an AM device, it can fully or partially control each of the elements. At least one of the elements may also have a processor and memory with prestored executable instructions, a data area, and a scratch area. Some or most of a task can be delegated to any of the elements of the AM device, as is commonly known in the computing industry.

FIG. 3

Figure 3:
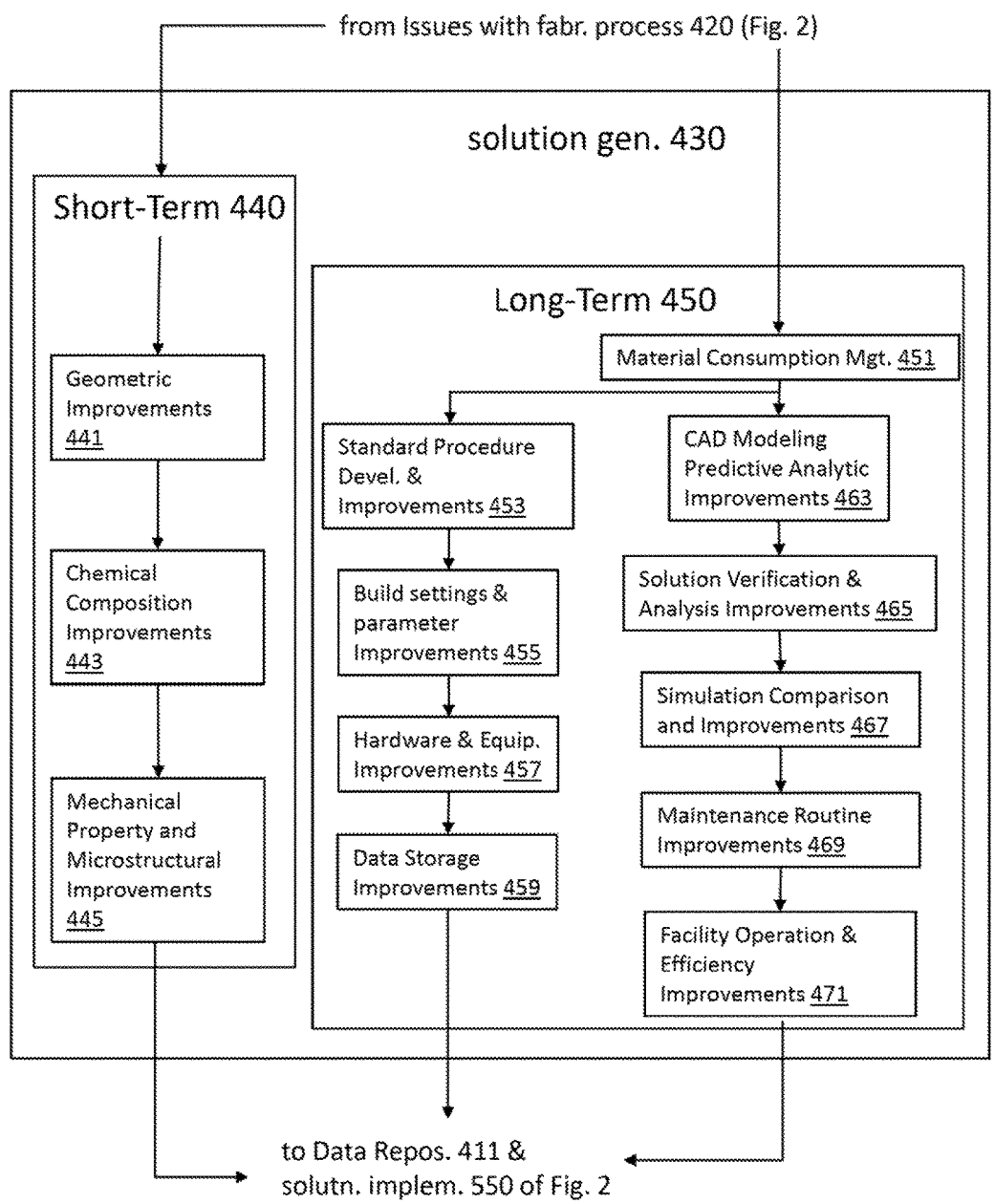
FIG. 3 is a more detailed block diagram of the solution generator 430 of FIG. 2B.

FIG. 3 is a more detailed block diagram of the solution generator 430 of FIG. 2B. Solution generator 430 includes both a Short-Term device 440 and a Long-Term device 450. FIG. 3 showcases additional examples of how the long-term decision-making process is utilized to improve long-term productivity of the AM system.

The Short-Term device 440 is primarily concerned with correcting errors detected in the product that it is currently manufacturing.

However, the Long-Term device 450 tries to find solutions which apply to all the AM devices, not just the one which is currently working on correcting the error.

In a first embodiment, Long-Term device 450 is part of solution generator 430 within an AM device 301-312.

In an alternative embodiment, at least some of the elements of Long-Term device 430, as shown in FIG. 3, will be implemented within Central system 200.

In this embodiment, not only is error information monitored and stored in a main storage area, such as Data Repository & Long-Term Storage 411 of any or all of the AM devices 301-312. Also, as indicated above, this Data Repository & Long-Term Storage may be implemented within central system 200.

In either embodiment, not only is error information collected and stored, but also information regarding the performance of the AM devices and their settings, configurations and other information defining the state of each AM device. Also, information is collected of parameters to be improved or optimized, and information on the independent variables which affect the parameters being optimized. This may become clearer as we walk through devices of the Long-Term Storage device 450 of FIG. 3.

In one embodiment, a Material Consumption Management device 451 may be employed in the Long-Term device 450.

If at least several AM devices were fitted with a measurement valve which kept track of the amount of raw material used to manufacture each product, the Material Consumption Management device 451 can then scan all past history and identify those products (and their corresponding AM devices with their settings and configurations) to determine several which have the lowest raw materials consumption. These may then be cross-correlated to determine common settings, or configurations. These common settings or configurations are then set on an AM device and a product is manufactured. The amount of raw materials is then measured. If this is an improvement and there are few or no drawbacks, then these settings and configurations may be proposed to all Follower AM devices to optimize raw material usage and waste.

Another device would be the Standard Procedure Development & Improvement subsystem 453. This also performs Long-Term autocorrection by monitoring and analyzing AM device performance history of slightly different procedural standards for equipment operation. This information is analyzed to find the procedural standards which optimize the time, costs, and/or minimize number of errors to manufacture a product.

These output parameters are listed as examples for AM manufacturing optimization, but other measurable output parameters may also be used, such as minimizing material waste, described above.

Please note that it is possible to minimize a combination of multiple output parameters. For example, one may optimize the sum of time to manufacture and amount of raw material required. Please note that when optimizing multiple outputs, each must be multiplied by a weighting factor to put both on equal footing. This weighting factor may be provided by the system Operator 3 and is usually based upon the parameter's value to the entity manufacturing the product. The weighting factor also adjusts for the units used for measurement.

For example, we would like to optimize (minimize) both the time to manufacture a product and the waste produced. In this case, the time is determined in minutes, and the waste is measured in grams. If a reduction in manufacturing time of one minute is just as valuable as a reduction in waste of 5 grams, then there the weighting factor of the waste will be 5 times that of the time.

The resulting states may be tested by implementing the state with the optimum results on one or more AM devices and comparing the time/waste against one or more other AM devices having different states.

A Build Settings & Parameter Improvements device 455 performs Long-Term autocorrection by researching material parameters and equipment build settings in the stored history of the AM devices. It then determines which entries exhibit the optimum desired results. These material parameters and equipment build settings of one or more AM devices found in the history which optimizes the selected output parameter (minimize cost, minimize errors, minimize waste, etc.) is then tested by implementing them on one or more AM device. The output parameter is then measured. If it is an improvement, these material parameters and equipment build settings are stored in Long-Term storage 450. As indicated above, Leader AM device 302 may then request that Follower AM devices implement these material parameters and equipment build settings.

Hardware & Equipment Improvements device 457 calculates Long-Term autocorrection results based upon improvements in equipment hardware. In this embodiment, at least one AM device has received a hardware upgrade. This is indicated to the Hardware & Equipment Improvements device 457. Device 457 then searches performance history for the modified AM devices and compares its output parameters to that of non-modified AM devices. It can then be determined if the output parameters of cost/error reduction/waste are significantly optimized by the improvements in equipment hardware. If so, the analysis is stored and the Operator 3 is notified that the improvements in equipment hardware will result in the determined amount of optimization of one or more the output variables.

Data Storage Improvements device 459 is employed to create Long-Term autocorrection results in data collection and storage improvements. The Data Storage Improvements device 459 searches the history data for AM devices which have improvements to their data storage. The output parameters are again compared to the output parameters of AM device not having the data storage improvements to determine if this is helpful in optimizing the AM devices, and if so, how much. Data storage improvements include the modification, deletion, segmentation, and sorting of data in data storage repository devices located on individual AM systems or within the central system.

Another device, the CAD Modeling Predictive Analytic Improvements device 463, can minimize long-term errors in manufacturing by altering portions of the 3D model.

The "CAD Modeling Predictive Analytic Improvements device 463" searches the history of at least one AM device and finds multiple errors which indicates that the physical abilities of the AM devices cannot reproduce at least one portion of the model. The 3D model may call for a 90-degree curve completed within 0.1 mm. However, the physical abilities of the AM devices can only make a 90-degree angle in a space of 0.2 mm or greater. In this case, no matter how the setting or configurations are adjusted, the AM devices cannot reproduce this portion of the 3D model.

If so, this information is stored in the Data Repository 411 and a notification is sent to Operator 3. The CAD Modeling device 463 may notify the operator 3 and request adjusting the tight corners in the 3D model to a larger size prior to fabrication.

The solutions generated provide data and insight useful for the improvements of CAD modeling software and predictive analytic software for AM processes & components. The system described herein is capable of autonomously utilizing data and insight to further improve CAD modeling software and predictive analytic software for AM processes & components.

Upon injecting a generated solution into the fabrication process, it is critical to verify the solution solved the issue for which it was intended. A Solution Verification & Analysis Improvements device 465 searches past history of AM devices which have been patched with a solution. The resulting deviations between the product and the 3D model are analyzed to determine how effective the solution was at correcting the errors. The results of this determination will be used to adjust similar solutions in the future.

Simulation Comparison & Improvements device 467 analyzes past history of AM devices employing solutions to determine aspects of the Simulations for AM processes & components which should be adjusted. For example, Simulation Comparison & Improvements device 467 compares simulation models to actual AM device data. As indicated above, if there are portions of the model which exceed the capabilities of the AM devices, an indication of such is stored for future modification and simulation of the 3D model.

There are automated maintenance routines performed by the AM devices, such as calibration of the position of the controller 415, extrusion of materials out of deposition device 417 to clean the nozzle, testing of the laser power for deposition devices 417 which melt powdered metal, etc.

A Maintenance Routine Improvement device 469 searches AM device history for AM devices which have recently run a maintenance routine, then checks its performance relative to the output parameter which the maintenance routine is supposed to correct.

Using the example of the extruder maintenance routine, the extruder flows before and after the routine are compared for a specific maintenance routine. AM device history is searched for other extruder maintenance routines. The output results are compared to determine which of these maintenance routines is most effective. Once determined, it is stored and again, the Leader AM device may request that the Followers implement this maintenance routine in the future. Long-Term autocorrection results in improved maintenance routines and AM process uptime.

If there are facility operation improvements or efficiency improvements, a Facility Operation & Efficiency Improvements device 471 searches the history to determine overall facility efficiency before and after the facility operation improvements. A determination of which output parameters are relevant is made. These output parameters are analyzed by the Facility Operation & Efficiency Improvements device 471 to determine if the facilities operation improvements have improved the relevant output parameters. If so, then these are stored, and a notification is provided to the Operator 3 that these be implemented throughout the facility, or if already implemented, that these remain implemented. This Long-Term autocorrection results in overall increases in facility operation efficiency.

Traceability Reporting

If employing the Central System 200, it can permanently store data for the traceability reporting of 3D printed components built using the Leader-Follower system 1000. The central system also allows for the analysis of stored data in order to improve the fabrication of future 3D printed components.

Since each product created with AM has some small errors, each is unique, like diamonds. In some engineering areas, it is required to know the limits of the parts being used. For example, it is important for the engineer to know the good and the bad of each AM product, such as a bearing. If the internal flaws are known, the engineer using that specific bearing will be able to estimate its maximum running RPM speed, ability to withstand impact with objects, and expected life before replacement. Since the current process, described herein, provides traceability and can keep track of all flaws and send them along with the product, it can result in accurate expectations. This will also allow one to 'grade' the products. For example, one with very few flaws may cost more but will be able to be used in a passenger jet turbine. Whereas lower bearings may be used in turbines for portable electric power generators.

FIG. 4

Figure 4:
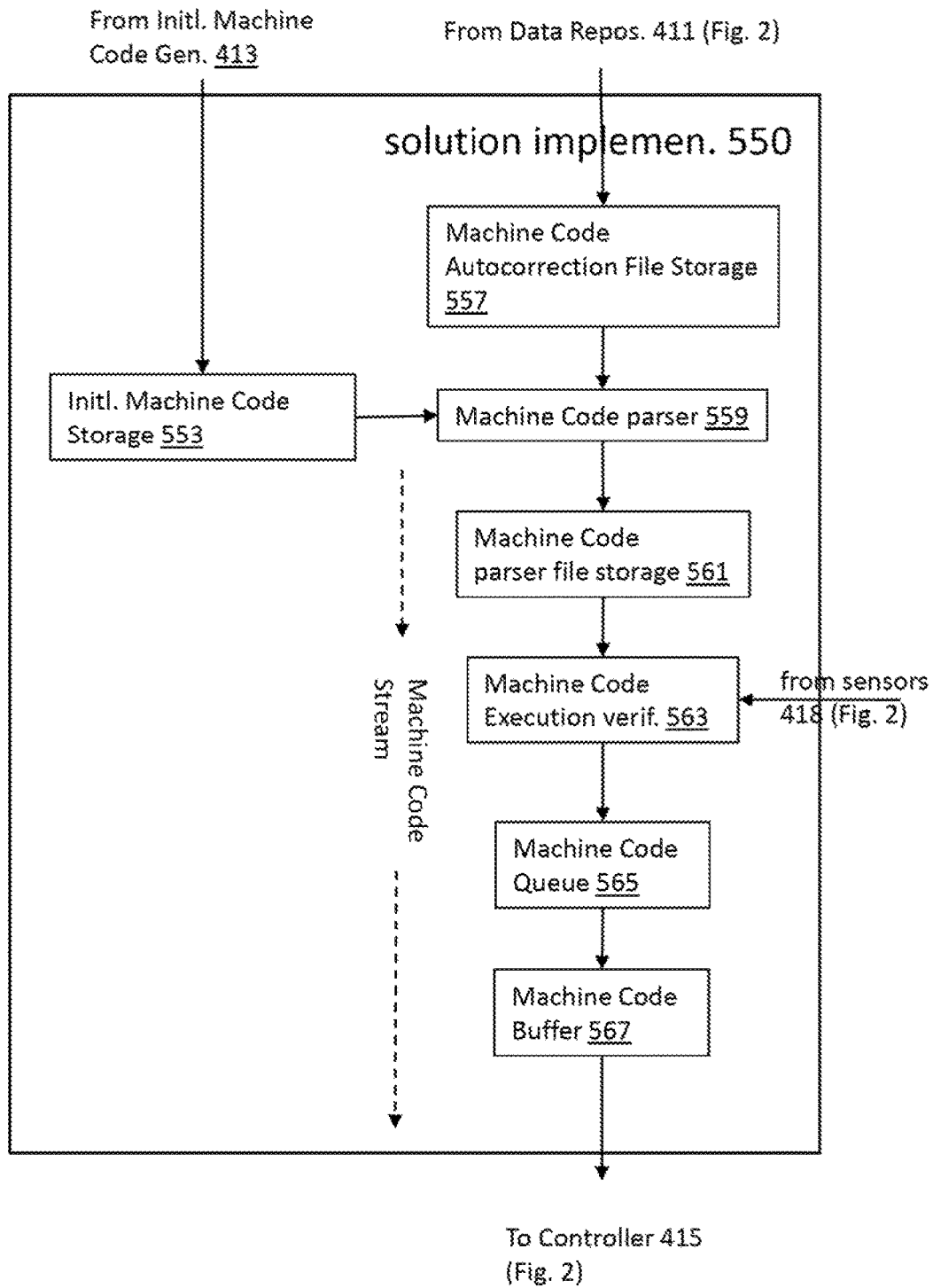
FIG. 4 is a more detailed block diagram of the solution implementation device 550 of FIG. 2B.

FIG. 4 is a more detailed block diagram of the solution implementation device 550 of FIG. 2B. The Leader-Follower system has the unique capability of enabling a factory of AM devices to discern issues with the 3D printing fabrication process and create solutions to fix those issues and prevent them from impacting factory output and from happening again. To accomplish this, the solution implementation device 550 generates solutions in the form of machine code and injects that machine code into the real-time 3D printing process such that the individual AM devices are able to continue building components without the need to stop the fabrication process.

In order to achieve this, autocorrection data is handled in a novel manner that enables individual AM device PLC's, hardware, and sensors to properly implement machine code data during the fabrication process.

However, existing AM devices consume initial machine code, generated by converting the original digital file to machine code, such that controlling the injection of autocorrection machine code becomes difficult.

To further understand the machine code consumption issue, the below analogy is provided.

Imagine you are at your first day of gym class with no prior physical exercise knowledge. Your gym instructor tells you to perform the following list of actions sequentially, all the way through, before stopping:

Jump up and down 1 time

Perform 5 pullups

Perform 10 push ups

The instructor tells you to begin and you start performing the exercises. However, since you have never performed these movements before in this exact manner, you mess them up and the instructor begins telling you how to do them better before you are finished going through the whole list. Unfortunately, you go through the actions sequentially and all the way through before being able to stop (per the instructor's initial request). This prevents you from being able to properly implement the constructive criticism your instructor has provided you while you performed the exercises. Effectively you have become overwhelmed with useful information to help you accomplish the exercises correctly, while you are performing them for the first time.

This is the issue many AM devices face when fabricating components. AM devices are often provided the full initial machine code file (list of exercises and instructions) by an operator (instructor) required to fabricate a unique geometry in its entirety. However, due to inherent reliability issues in the 3D printing fabrication process, errors often occur that create issues with the fabrication of components. When connected to the Leader-Follower system and utilizing in-situ process monitoring data to detect errors/issues within the fabrication process, subsequently generated autocorrections (instructor constructive criticism) are sent to the AM device. If the AM device does not have a specific methodology for consuming the initial machine code along with autocorrections, the AM device (and its PLC) can become overwhelmed with information which causes autocorrections to be randomly injected into the 3D printing process rather than at precise and specific intervals. Without the ability to completely control when autocorrections are injected into the 3D printing fabrication process, the usefulness of a system, such as the Leader-Follower system that uses autocorrections, is nullified.

The problem with current state of the art AM devices is that once data is on the AM device PLC, there is no way to control how quickly or when it is translated into physical action during the fabrication process (i.e., machine code is converted to electrical signals which activate motors, heating elements, etc.). This means there is also no way to control precisely when actions are taken by the AM device and if those actions were executed correctly prior to performing the next action listed in the machine code.

To solve this problem, the Machine Code Parser 559 and corresponding sub-systems take machine code data that encompasses multiple actions by AM device sensors and hardware and separates (also known as "parsing") the machine code into separate data packets for the controller 415 to receive and execute. This novel methodology allows for the execution to be sensed by sensors 418 (FIG. 2) and verified by Machine Code Execution Verification 563 of solution implementation device 550.

The 3D printing process then functions by receiving the 3D model from Data Repository and Long-Term Storage 411 (FIG. 2) and providing it to an Initial Machine Code Generator 413. Previously developed Machine Code Autocorrection is also passed from Data Repository and Long-Term Storage 411 and stored in Machine Code Autocorrection File Storage 557.

Initial Machine Code Generator 413 slices and converts the 3D model into layers of machine code which are the line by line instructions used by an AM device to manufacture a part. Once generated the machine code is stored in Machine Code Storage 553. The machine code is them sent to a Machine Code Parser 559.

The Machine Code Parser 559 stores the parsed machine code in Machine Code Parser File Storage 561. The Machine Code Parser 559 also sends the parsed machine code to controller 415 of FIG. 2 that converts the machine code, via its firmware, into electrical signals that are then sent to the motors, heating elements, etc. on the AM device that carry out the physical action of fabricating 3D printed components.

By sending data in smaller chunks (parses), the Machine Code Queue 565 and Machine Code Buffer 567 are able to inject autocorrection machine code exactly where it is required rather than just having to inject machine code into the Machine Code Stream and having it shoved in between random other machine code commands.

Precise placement of machine code improves the effectiveness of autocorrections which greatly improves how quickly errors occurring during the fabrication process are addressed and fixed, which ultimately improves the quality of 3D printed components. Improved quality of 3D printed components means less failures and better factory efficiency. Improved efficiency of the factory environment means higher margins and an increased ability to compete with traditional mass manufacturing technologies and methods.

Note: Current state of the art methods often have machine code data continuously transmitted from a computational device to an AM device's PLC. The data transfer between computational device and AM device PLC is hereby described as the Machine Code Stream. Additionally, AM device PLC's have onboard storage that temporarily retains machine code received from the Machine Code Stream. This temporary storage location makes up the Machine Code Buffer sub-system.

The Machine Code Stream is the open path of communication between a computational device and the PLC of an individual AM device within the Leader-Follower methodology. Normally, machine code data is tossed into the Machine Code Stream and is transmitted to the AM device PLC and then the machine code data sits in the Machine Code Buffer (i.e., storage space on the PLC) until the PLC finishes converting, via firmware, the machine code data into electrical signals for the individual AM device hardware and sensors to execute as physical actions in the 3D printing fabrication process. However, the Machine Code Buffer 567 acts as a dam and stops the flow of the Machine Code Stream once the onboard storage space of the controller 415 is filled.

Since the Machine Code Buffer holds machine code by memory size and not by number of machine code commands, it is extremely difficult to determine what machine code commands, and how many, are in the Machine Code Buffer at any given moment during the 3D printing fabrication process. This creates additional logistical concerns when trying to confirm that machine code was correctly translated into electrical signals and then properly executed by the AM device during the fabrication process. Verification of machine code execution is crucial to detecting and discerning when errors/issues during the 3D printing process occur.

To address this issue and implement the ability to verify machine code is executed by hardware and sensors correctly, the Machine Code Queue 565 and Machine Code Execution Verification sub-systems 563 were created. Effectively, once the first machine code command, or set of commands, is separated by the Machine Code Parser 559 and stored in the Machine Code Parsed File storage 561, the first machine code command is transmitted to the Machine Code Execution Verification sub-system 563. The Machine Code Execution Verification sub-system 563 determines if the previous machine code command has been correctly executed by the individual AM device and then, if it has been, the Machine Code Execution Verification sub-system 563 releases the next machine code command to the rest of the sub-systems down the line, as seen in FIG. 4.

Note: If a previous machine code command was executed incorrectly, autocorrection data is generated by the Leader-Follower system and injected, ahead of the next command, into the Machine Code Stream during the 3D printing fabrication process. If no previous machine code command is being executed or verified (i.e., the start of a new 3D print), the Machine Code Verification sub-system 563 releases the initial machine code command for data transmission through the remaining sub-systems.

In this embodiment, the Machine Code Queue 565, which is the next sub-system inline, receives the machine code command or commands, and tracks when and in what order it was received relative to any other commands that have passed through to the individual AM device. The machine code commands, referred to as a "machine code stream", are transmitted to the Machine Code Buffer 567 in the solution implementation device 550. The Machine Code Buffer 567 consumes the machine code and the firmware installed on the PLC 600 executes the machine code command from the Machine Code Buffer 567 to convert the machine code command into electrical signals for the hardware. Once the electrical signals have been carried out by the individual AM device hardware, sensor data is transmitted back to the Machine Code Execution Verification sub-system which discerns if autocorrection machine code is required or if the next batch of machine code commands can be sent to the AM device via the sub-systems laid out in FIG. 4.

In an embodiment, similar to the example methodology shown in FIG. 4, that utilizes a Machine Code Parser sub-system 559 and a Machine Code Execution Verification sub-system 563, that can communicate through the PLC 600 and the communication device 430, the Leader can have control when machine code is passed to each individual AM device within the Leader-Follower system and when machine code is executed by the AM device. Additionally, the example showcases how this methodology, when implemented along with a Leader-Follower system, enables for precise autocorrection generation and machine code injection into the 3D printing fabrication process such that AM device hardware and sensor action produce a higher quality 3D printed product.

Note: By controlling and verify the consumption and execution of machine code, more accurate estimations for the time required to fabricate components be also achieved. Existing time estimation algorithms for the 3D printing fabrication process currently lack accuracy. The precise verification of executed machine code, as shown in FIG. 5, allows for time estimation accuracy.

FIG. 5

Figure 5:
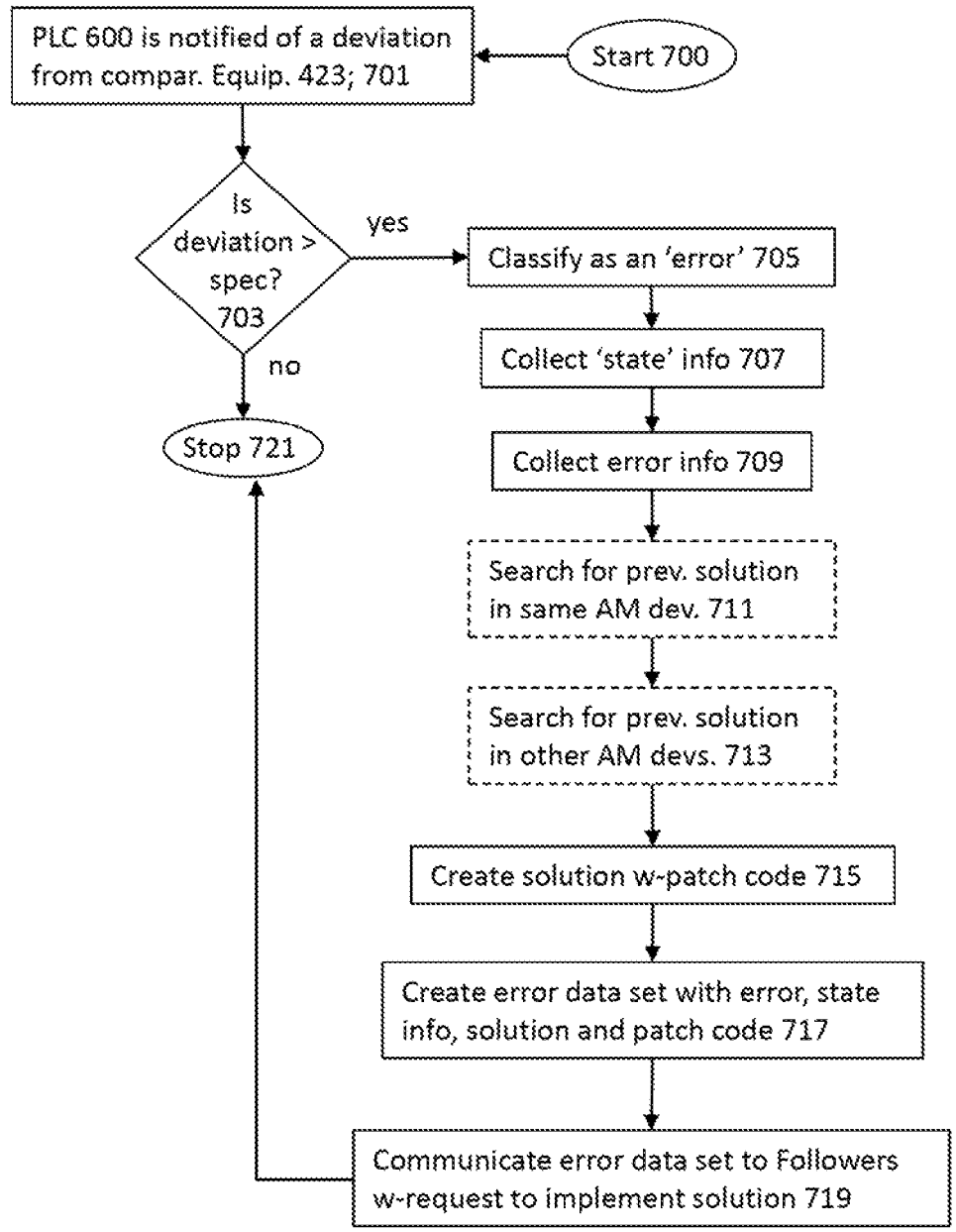
FIG. 5 is a flowchart of one embodiment of the logic running inside the PLC (programmable logic circuit) of Leader AM device.

FIG. 5 is a flowchart of one embodiment of the logic running inside the PLC 600 of Leader AM device 302.

The process Starts in block 700.

In block 701, the PLC 600 receives a notification from the Comparison Equipment 423 of FIG. 4 indicating that the product being manufactured has a deviation from the 3D model.

In step 703, it is determined if the deviation is greater than allowed by the manufacturing specs.

If not, "no", then the process stops at step 721.

If it is decided that the deviation is greater than allowed in the manufacturing specifications "yes", then the deviation is classified as an 'error' in block 705.

In step 707, the PLC 600 then collects all information relating to the settings, performance, configurations, sensor 418 readings, to indicate the 'state' of the Leader AM device 302 when the error occurred.

In step 709, the PLC 600 also operates to collect the deviation, error, relevant manufacturing specs., and information relating to the error which occurred.

Step 711 is an optional step in which Leader AM device 302 searches its own prior history to determine if the same error occurred before. This prior history may be stored in Data Repository 411, or in issues with fabrication process 420, both of FIG. 2B. Alternatively, this information may be stored anywhere on the system, including Central System 200 of FIG. 1, as long as it is accessible by the element which needs to read and analyze the information.

If a similar error is found, it may be possible to use the previous solution instead of trying to create another one. This reduces processing time, speeds up error recovery and adds uniformity to the products created.

In another optional step 713, Leader AM device 302 may search the previous error data sets of other AM devices either by connecting to them directly or searching through the Central System 200. Central system 200 may include a database storing the error data sets of all of the AM devices 301-312.

Alternatively, each AM device 301-312 may hold its own past history of error data sets, and Central System 200 merely makes a link between the Leader AM device 302 and any desired AM device 301, 303-312.

Now PLC 600 of Leader AM device 302 can search through the error data sets to find one with similar errors and state. The solution of this error data set may then be used to correct the current error sensed by Leader AM device 302.

There will be some inherent logic built into PLC 600 of Leader AM device 302 that it should only search for a predetermined period of time, because it may take less time to develop a new solution as compared with searching many error data sets.

In step 715, a solution is created along with a machine code patch which can be inserted into the solution implementation device 650.

In step 717, an error data set is created from error information, state information, solution information, including patch code.

This data set is stored in step 719. As indicated above, each AM device may store it locally, it may be stored in a device having system-wide access, such as Central system 200, or other digital memory storage device of the Leader-Follower system 1000.

In step 721, the PLC 600 of the Leader AM device 302 then communicates a request to implement the solution to other AM devices 301, 303-312. The error data set may be sent at large to all AM devices, or optionally only to those which respond requesting such information.

The process stops for Leader AM device 302 in step 721.

FIG. 6

Figure 6:
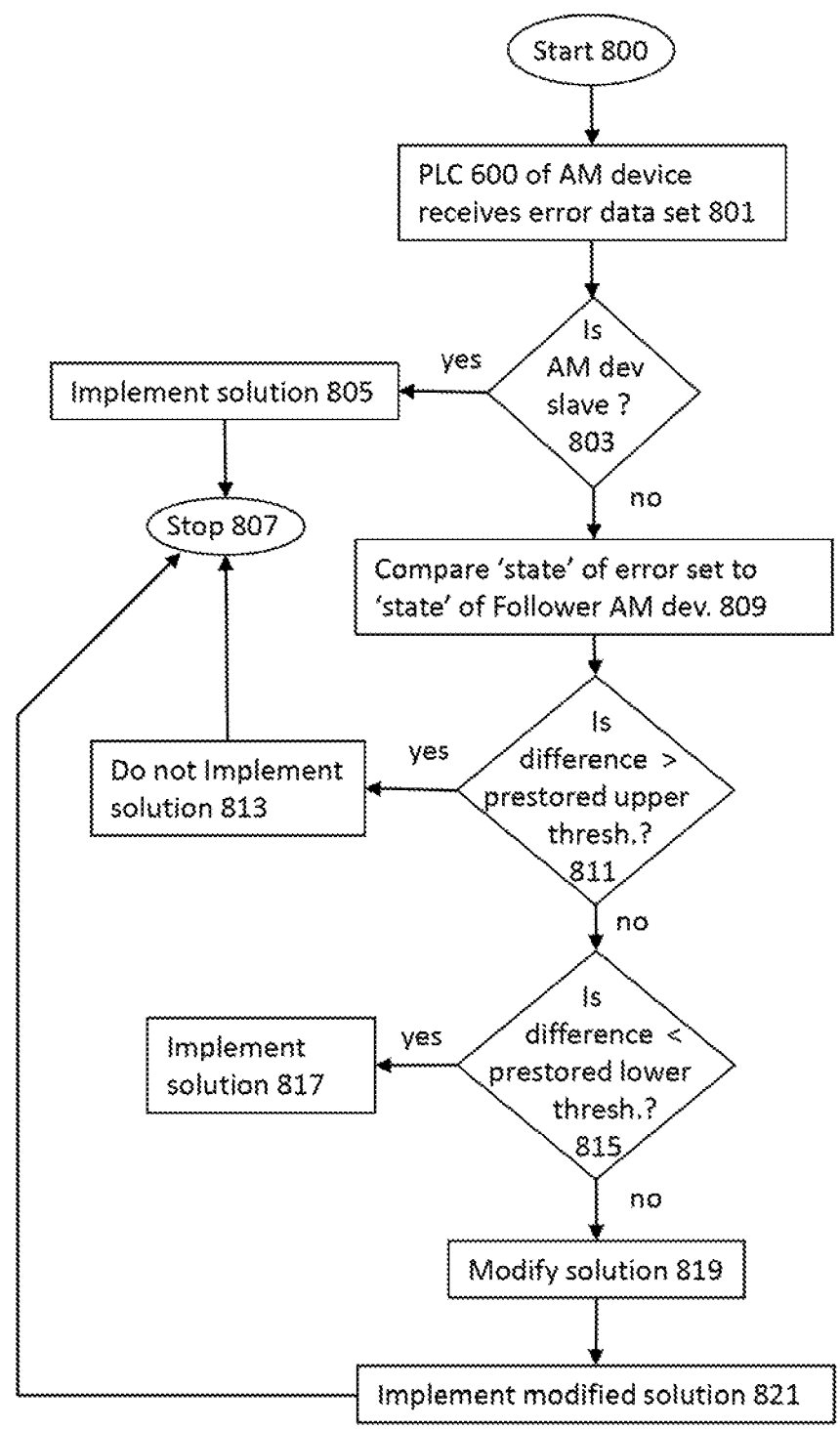
FIG. 6 is a flowchart of one embodiment of the logic running inside the PLC of a Follower AM device.

FIG. 6 is a flowchart of one embodiment of the logic running inside the PLC 600 of at least one Follower AM device 301, 305-312.

The process starts at block 800.

In step 801, the PLC 600 receives request to implement an error solution, and with error data set from the Leader AM device 302.

In step 803, the AM device determines if it was designated as a Slave or Follower.

If it were previously designated as a Slave "yes", then in step 805, it receives and implements the unmodified solution at the proper point in the manufacturing process.

The process then stops in step 807.

If in step 803 the AM device was not previously designated as a Slave, "no", then in step 809, it compares the 'state' information of the error data set with its own state information.

If the difference between the states is greater than a prestored upper threshold, "yes", then the solution of the error data set is not implemented, and the process stops at step 807.

If the difference determined in step 811 is not above the prestored upper threshold, "no", then the comparison of step 815 is performed.

In step 815, if the difference between the state comparisons is less than a prestored lower threshold, "yes", then the unmodified solution is implemented in step 817.

In step 815, if the difference between the state comparisons is not less than a prestored lower threshold, "no", then the solution is modified in step 819 and implemented in step 821.

The process then stops in step 807.

Through the use of the current system, the single operator's productivity is greatly increased, so much so that an operator could control hundreds, if not thousands of 3D printers simultaneously, therefore allowing for the mass manufacture of 3D printed components for end-use consumer applications such as customer orthopedic implants for every unique customer, custom dental implants for each unique customer, etc.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the foregoing aspects are illustrative, and no single feature or element essential to all possible combinations may be claimed in this or a later application.

What is claimed is:

1. A system for manufacturing multiple Additive Manufactured products comprising:
   a plurality of additive manufacturing (AM) devices each adapted to produce a product based on a three-dimensional (3D) computer model using additive manufacturing, wherein at least one of the AM devices is identified as a Leader AM device such that each of the AM devices comprises:
      a plurality of sensors operatively coupled to each of the AM devices to sense physical attributes of each of the AM devices and the respective product being produced;
      monitoring equipment operatively coupled to the plurality of sensors to monitor physical attributes of the product being produced and the AM device;
      comparison equipment operatively coupled to the monitoring equipment to measure at least one physical attribute deviation between the product being produced and the 3D model, determine which at least one of the physical attribute deviations is outside of predetermined specifications of the 3D model and identify the at least one physical attribute deviation which is outside of predetermined specifications of the 3D model as an error;
      a communication device adapted to communicate with other AM devices of the plurality of AM devices and a central system;
      a solution generation device adapted to analyze the error and generate machine code to provide a solution to the Leader AM device to correct the error; and
      a programmable logic circuit (PLC) attached to and at least partially controlling the AM devices, wherein the PLC is further adapted to communicate a request from the Leader AM device to other AM devices which are not the Leader AM device to implement the solution in order to correct the error;
   wherein at least one of the other AM devices of the system is identified as a Follower AM device, wherein the Follower AM device comprises:
      monitoring equipment which monitors and stores settings and configuration information of the Follower AM device;
      a communication device communicating at least settings and configuration information of the Leader AM device and the settings and configuration information of the Follower AM device, error information of the Leader AM device and solution information of the Leader AM device between the Follower AM device and the Leader AM device; and
      a PLC of the Follower AM device having executable code which allows the Follower AM device to receive the error information, the settings and configuration information of the Leader AM device, and the solution information from the Leader AM device, wherein the PLC of the Follower AM device also includes executable code that determines a difference between the settings and configuration information of the Leader AM device and the Follower AM device and makes decisions on an implementation of the solution sent by the Leader AM device based upon the determined difference,
      wherein the PLC of the Follower AM device has a pre-stored upper threshold and a pre-stored lower threshold and executable code allowing the PLC of the Follower AM device to control the communication device of the Follower AM device to request and receive the error information from the Leader AM device and the Leader AM device settings and configuration information;
      the PLC of the Follower AM device having executable code to implement the solution if the determined difference is below the lower threshold;
      the PLC of the Follower AM device having executable code to not implement the solution if the determined difference is above the upper threshold; and
      the PLC of the Follower AM device having executable code to implement a modified version of the solution if the determined difference is equal to or between the upper threshold and lower threshold.

2. The system of claim 1, wherein at least one of the other AM devices of the system is identified as a Slave AM device; and
   wherein the solution generation device in the Leader AM device determines the solution and an action to correct the error and sends a command for the Slave AM device to implement the solution and an action; and wherein the PLC of the Slave AM device includes executable code to cause the Slave AM device to implement the action and the solution.

3. The system of claim 1, wherein the PLC of at least one Follower AM device includes executable code which adjusts the solution in proportion to the determined difference between the settings and configuration information of each Follower AM device and the settings and configuration information of the Leader AM device to result in the modified solution.

4. The system of claim 3, wherein at least one Follower AM device further comprises:
a deposition device that creates a layer of the produced product;
a controller which positions the deposition device to create the layer at a position on the product;
a solution implementation device having executable code to break the solution into component data packets and feed the component data packets to the deposition device and the controller.

5. The system of claim 1 further comprising:
a data repository and storage device adapted to receive and store the error information of the Leader AM device, the settings and configuration information of the Leader AM device and the Follower AM device, and the solution information of the Leader AM device.

6. The system of claim 5, wherein the data repository and storage device is located within at least one of the AM devices.

7. The system of claim 5 further comprising:
the central system communicating with the AM devices, wherein the central system includes the repository and storage device.

8. The system of claim 5, wherein the solution generation device further comprises:
a short-term solution generation device that determines solutions for errors found in the product being produced; and
a long-term solution generation device that determines solutions for errors found which apply for a product being produced by more than one AM device.

9. The system of claim 8, wherein the short-term solution generation device comprises at least one of:
a geometric improvements device adapted to analyze geometric errors in the product being produced and generate machine code to correct a geometry of the product being produced;
a chemical composition device adapted to analyze chemical composition errors in the product being produced and generate machine code to correct a chemical composition of the product being produced; or
a mechanical property device adapted to analyze microstructural errors in the product being produced and generate machine code to correct a microstructure of the product being produced.

10. The system of claim 8, wherein the long-term solution generation device comprises at least one of:
a material consumption management device adapted to analyze material consumption of at least two AM devices, wherein the at least two AM devices have different material flow settings, to determine which of the material flow settings of the at least two AM devices optimizes a preselected output parameter;
a procedure development and improvements device adapted to analyze stored performance and errors of the at least two AM devices to determine procedures of the at least two AM devices that optimize the preselected output parameter;
a build settings and parameter improvements device adapted to analyze stored build settings and errors from the at least two AM devices to determine build settings of the at least two AM devices that optimize the preselected output parameter;
a hardware and equipment improvements device adapted to analyze performance and error information from the at least two AM devices having different hardware and equipment to determine which hardware and equipment of the at least two AM devices optimizes the preselected output parameter;
a data storage device adapted to analyze performance and error information from the at least two AM devices, wherein the at least two AM devices have different data, storage equipment to determine which data storage equipment of the at least two AM devices optimizes the preselected output parameter;
a CAD modeling predictive analytic device adapted to analyze performance and error information from the at least two AM devices, wherein the at least two AM devices have different geometric adjustment settings to determine which geometric adjustment settings of the at least two AM devices optimize the preselected output parameter;
a solution verification and analysis device adapted to analyze performance and error information from the at least two AM devices, wherein the at least two AM devices implement different solutions to determine which data solutions of the at least two AM devices optimize the preselected output parameter;
a simulation comparison and improvements device adapted to analyze performance and error information from the at least two AM devices, wherein the at least two AM devices implement different 3D model simulations to determine which 3D model simulations of the at least two AM devices optimize the preselected output parameter;
a maintenance routine improvements device adapted to analyze performance and error information from the at least two AM devices, wherein the at least two AM devices implement different maintenance routines to determine which maintenance routines of the at least two AM devices optimize the preselected output parameter; or
a facilities operation and efficiency device adapted to analyze performance, and error information from the at least two AM devices, wherein the at least two AM devices implement different facilities upgrades to determine which facilities upgrades of the at least two AM devices optimize the preselected output parameter.

11. The system of claim 10, wherein the preselected output parameter is one of the group consisting of:
a cost to produce the product;
a time it takes to produce the product;
a number of errors in the produced product;
an AM process reliability;
an AM process repeatability; and
a total deviation from expected output measured in the produced product.

12. The system of claim 5, wherein the solution implementation device further comprises:
a machine code storage coupled to a machine code generator to receive model slice data packets of the 3D model from the machine code generator and store the model slice data packets, wherein each of the model slice data packets of the 3D model contains data on a different individual layer of the 3D model;

a machine code autocorrection file storage operatively coupled to the data repository storage which receives and stores an autocorrection machine code representing the solution to correct the error;

a machine code parser coupled to the machine code storage and the machine code autocorrection file storage, wherein the machine code parser is adapted to parse the autocorrection machine code from the autocorrection file storage and the model slice data packets from the machine code storage, a machine code parser file storage, wherein the machine code parser file storage is adapted to store the parsed autocorrection machine code and the model slice data packets;

a machine code queue coupled to the machine code parser file storage, wherein the machine code queue is adapted to extract the parsed autocorrection machine code and the model slice data packets from the machine code parser file storage and arrange the parsed autocorrection machine code and the model slice data packets in an order; and a machine code buffer coupled to the machine code queue, wherein the machine code buffer is adapted to feed a controller with the parsed autocorrection machine code and the model slice data packets at a rate to cause the model slice data packets and autocorrection machine code to implement the solution.

13. A method of mass producing a product from a three-dimensional (3D) model using a plurality of networked additive manufacturing AM devices, wherein each AM device builds a product and monitors deviations of the product being built from a 3D model, the method comprising the steps of:

building a portion of the product on at least one AM device of the plurality of AM devices;

monitoring the product being built to identify deviations of the product being built from the 3D model;

notifying a programmable logic circuit (PLC) of the at least one AM device of deviations by the product being built from the 3D model;

determining if the deviations of the product being built are outside of a predetermined specification of the 3D model;

in response to determining if the deviations of the product being built are outside the predetermined specification, then identifying the deviation as an error, and the designating the at least one AM device as a Leader AM device;

collecting and storing settings and configuration information of the Leader AM device;

collecting and storing error information of the Leader AM device;

employing a solution generator which creates a machine code solution to correct the error based upon the error information of the Leader AM device;

creating an error data set with error information, settings and configuration information and the machine code solution of the Leader AM device;

communicating the error data set to other AM devices from the Leader AM device with a request to implement the machine code solution by the other AM devices; and implementing at least a portion of the machine code solution on at least one of the other AM devices of the plurality of AM devices, wherein the step of implementing at least a portion of the code solution, comprises the steps of:

receiving by at least one of the other AM devices of the plurality of AM devices, the error data set, machine code solution and settings and configuration information of the Leader AM device from the Leader AM device;

determining if the at least one of the other AM devices is a Slave AM device;

if the at least one of the other AM devices is determined td be a Slave AM device, then implementing the machine code solution;

if the at least one of the other AM devices is determined not to be a Slave AM device, then the method comprises the following steps;

collecting settings and configuration information from the at least one of the other AM devices and comparing the settings and configuration information received from the Leader AM device to settings and configuration information of the at least one of the other AM device to determine a difference between the settings and configuration information of the Leader AM device and the settings and configuration information of the at least one of the other AM device;

if the difference between the settings and configuration information of the Leader AM device and the settings and configuration information of the at least one of the other AM devices is greater than an upper predetermined threshold, then the machine code solution is not implemented on the at least one of the other AM devices;

if the difference between the settings and configuration information of the Leader AM device and the settings and configuration information of the at least one of the other AM devices is less than a lower predetermined threshold, then implementing the machine code solution on the at least one of the other AM devices; if the difference between the settings and configuration information of the Leader AM device and the settings and configuration information of the at least one of the other AM devices is at least equal to the lower threshold but not more than the upper predetermined threshold, then, modifying the machine code solution, and implementing the modified machine code solution on the at least one of the other AM devices.

* * * * *